Patented June 25, 1929.

1,718,292

UNITED STATES PATENT OFFICE.

BIRGER FJELD HALVORSEN, OF OSLO, NORWAY, ASSIGNOR TO NORSK HYDRO-ELEKTRISK KVAELSTOFAKTIESELSKAB, OF OSLO, NORWAY.

PROCESS FOR THE PRODUCTION OF ALKALI-METAL SILICATES THAT ARE SOLUBLE IN WATER.

No Drawing. Application filed May 14, 1925, Serial No. 30,366, and in Norway May 19, 1924.

As it is known, alkali metal silicates that are soluble in water (soluble glass) are produced by melting pure sand with alkali metal carbonates or sulphates and coal in glass furnaces. These silicates have also been produced on a smaller scale by treating diatomaceous earth with alkali metal hydroxide. It has also been suggested that alkali metal silicates be produced by melting the alkali metal nitrates with quartz sand. This method has not, however, lead to any result that can be of technical use and consequently it has never been employed on an industrial scale.

According to the present invention, however, soluble glass can be produced from hydrated silicic acid and compounds of alkali metal, oxygen and nitrogen, when adopting the following method.

If, as a raw material, silicates in their natural state that are decomposed by acid are used, for instance, labradorite, leucite or similar material, these silicates are treated first in the usual manner with an acid, for instance, nitric acid, which dissolves the bases and leaves behind the silicic acid in a hydrated, porous and very pure state. This silicic acid is then mixed with an alkali metal-nitrogen-oxygen compound, for instance, Chilean nitrate, a nitrite or a mixture of nitrite and nitrate, such as is obtained, for example, when nitrous gases are absorbed in alkaline solutions. The mixture is heated to such a degree that alkali metal silicates are formed whilst the nitrogen oxides are expelled. This reaction commences at 250° C., and the conversion process is concluded at 600–700° C. without the mass melting. The reaction product is extremely porous and is easily dissolved in water, especially if a somewhat higher temperature and pressure is used. After filtering, a solution of pure soluble glass is obtained. The nitrous gases which escape are converted by the well-known method into nitric acid. Thus the alkali that is necessary for the formation of alkali metal silicates is cheaply obtained, as it is the nitrogen content only that decides the price of the alkali metal compound, and the nitrogen used in the process is recovered in the form of nitric acid, silicic acid in its natural state, diatomaceous earth, can also be used in this process as it has been proved that diatomaceous earth reacts in the same way as artificial, hydrated, silicic acid.

By employing the above method with a silicic acid residue obtained by treating soluble silicates with an acid, or by using it with diatomaceous earth, there is the advantage that the process can be performed at a comparatively low temperature. The loss of nitrogen which, if the mass has to be melted, is rather large, is thereby reduced. The use of melting furnaces is avoided as well as the disadvantages pertaining thereto and the process can be effected in closed furnace systems, so that the mass can either be heated directly by means of hot gases, for instance, from an electric nitrogen oxidation furnace, or it can be heated indirectly, by means of ordinary heating gases. By using the residue from soluble silicates, an unpleasant waste product is utilized which would otherwise accumulate in large quantities round those factories which manufacture alumina and alkali metal compounds from such silicates.

If nitrate of potassium or a substance which contains considerable quantities of nitrate of potassium is chosen as the alkali metal-oxygen-nitrogen compound, a porous, easily pulverized product is obtained which makes an excellent fertilizer, as besides containing potassium, it also contains silicic acid in an easily soluble state, which according to Professor Lemmermann, can partly replace phosphoric acid.

Thus it is possible to utilize, in a very profitable way, certain kinds of rock, such as leucite, that contain potassium and are soluble in acid. If the rock is dissolved in nitric acid, nitrate of potassium is obtained. This is then mixed with a part of the silicic acid and is heated, whereby silicate of potassium that is soluble in water is obtained. The solvent used, nitric acid, is recovered and can be used again, so that by means of a comparatively small amount of acid large quantities of fertilizer can be produced.

By heating various amounts of the residue of leucite (from 3 to 5 molecules of $SiO_2$) with the same quantity of sodium nitrite (1 molecule of $Na_2O$) to 630° C. and treating the product thus obtained with water, solutions can be produced that contain from 1.85 to 2.8 mol. of $SiO_2$ per mol. of $Na_2O$.

The following may be stated as examples of how the method may be performed:

(1) 8 portions of sodium nitrite and 20 portions of diatomaceous earth are heated to 600° C.

(2) 10 portions of sodium nitrite and 25 portions of leucite residue are heated to 610° C.

(3) 6 portions of sodium nitrate and 12.5 portions of residue of leucite are heated to 610° C.

(4) 10 portions of potassium nitrate and 11 portions of residue of leucite are heated to 600° C.

Claims:

1. Process for the production of alkali metal silicates soluble in water, consisting in mixing compounds of an alkali metal with nitrogen and oxygen with silicic acid hydrate and heating to 250° C. or more, but below the melting point of the mass.

2. Process for the production of alkali metal silicates soluble in water, consisting in mixing nitrate of potassium with silicic acid hydrate and heating the mixture to 250° C. or more, but below the melting point of the mass.

3. Process for the production of an alkali-metal silicate soluble in water comprising treating with nitric acid a silicate which contains an alkali-metal compound soluble in said nitric acid, separating alkali-metal nitrate from the resulting reaction products thereby leaving a residue containing silicic acid hydrate, mixing the said alkali-metal nitrate with a part of said residue, and heating the mixture to a temperature of 250° C. or more but below the melting point of the mass.

4. Process for the production of alkali metal silicates soluble in water, consisting in mixing compounds of an alkali metal with nitrogen and oxygen with silicic acid hydrate and heating to about 600° C.

In testimony whereof, I affix my signature.

BIRGER FJELD HALVORSEN.